(12) United States Patent
Carlson et al.

(10) Patent No.: US 6,671,936 B1
(45) Date of Patent: Jan. 6, 2004

(54) METHOD OF FABRICATING FIBROUS LAMINATE STRUCTURES WITH VARIABLE COLOR

(75) Inventors: Cheryl Lynn Carlson, Willow Springs, NC (US); Andrew Leonard Chier, Sherwood, AR (US); James Patrick Lenox, Holly Springs, NC (US); Nick Mark Carter, Mooresville, NC (US)

(73) Assignee: Polymer Group, Inc., North Charleston, SC (US)

( * ) Notice: Subject to any disclaimer, the term of this patent is extended or adjusted under 35 U.S.C. 154(b) by 282 days.

(21) Appl. No.: 09/634,482

(22) Filed: Aug. 8, 2000

Related U.S. Application Data
(60) Provisional application No. 60/213,368, filed on Jun. 23, 2000.

(51) Int. Cl.⁷ .............................. D04H 1/46; D04H 5/02
(52) U.S. Cl. ......................................... 28/104; 28/163
(58) Field of Search ...................... 28/103, 104, 105, 28/106, 163, 167, 107, 109, 112, 158; 442/382, 384, 387, 389, 408; 428/133, 137, 138, 139

(56) References Cited

U.S. PATENT DOCUMENTS

| | | | | |
|---|---|---|---|---|
| 2,862,251 A | * | 12/1958 | Kalwaites | 28/105 |
| 3,214,819 A | * | 11/1965 | Guerin | 28/104 |
| 3,485,706 A | | 12/1969 | Evans | |
| 3,705,064 A | * | 12/1972 | Lochner | 28/109 |
| 3,725,166 A | * | 4/1973 | McCord | 156/148 |
| 4,144,366 A | * | 3/1979 | Lewis | 28/109 |
| 4,144,370 A | * | 3/1979 | Boulton | 442/276 |
| 4,211,593 A | * | 7/1980 | Lochner | 28/109 |
| 4,519,804 A | * | 5/1985 | Kato et al. | 442/408 |
| 5,098,764 A | | 3/1992 | Drelich et al. | |
| 5,114,787 A | | 5/1992 | Chaplin et al. | |
| 5,144,729 A | | 9/1992 | Austin et al. | |
| 5,153,056 A | * | 10/1992 | Groshens | 28/104 |
| 5,175,042 A | * | 12/1992 | Chomarat | 28/104 |
| 5,290,628 A | | 3/1994 | Watabe et al. | |
| 5,405,650 A | * | 4/1995 | Boulanger et al. | 28/104 |
| 5,609,947 A | * | 3/1997 | Kamei et al. | 28/104 |
| 5,632,072 A | * | 5/1997 | Simon et al. | 28/163 |
| 5,737,813 A | * | 4/1998 | Sternlieb et al. | 28/163 |
| 5,459,912 A | | 8/1999 | Thewes et al. | |
| 5,942,452 A | | 8/1999 | Daponte et al. | |

* cited by examiner

Primary Examiner—Amy B. Vanatta
(74) Attorney, Agent, or Firm—Wood, Phillips, Katz, Clark & Mortimer

(57) ABSTRACT

A method of providing a color enhanced, patterned nonwoven based composite fabric wherein a hydroentangled, imaged nonwoven facing fabric exhibits variable fiber density in selected regions and where a colored backing material is laminated to the facing layer such that the color of the backing layer is observed as variable hues which coincide with regions of lower fiber density in the facing layer.

9 Claims, 8 Drawing Sheets

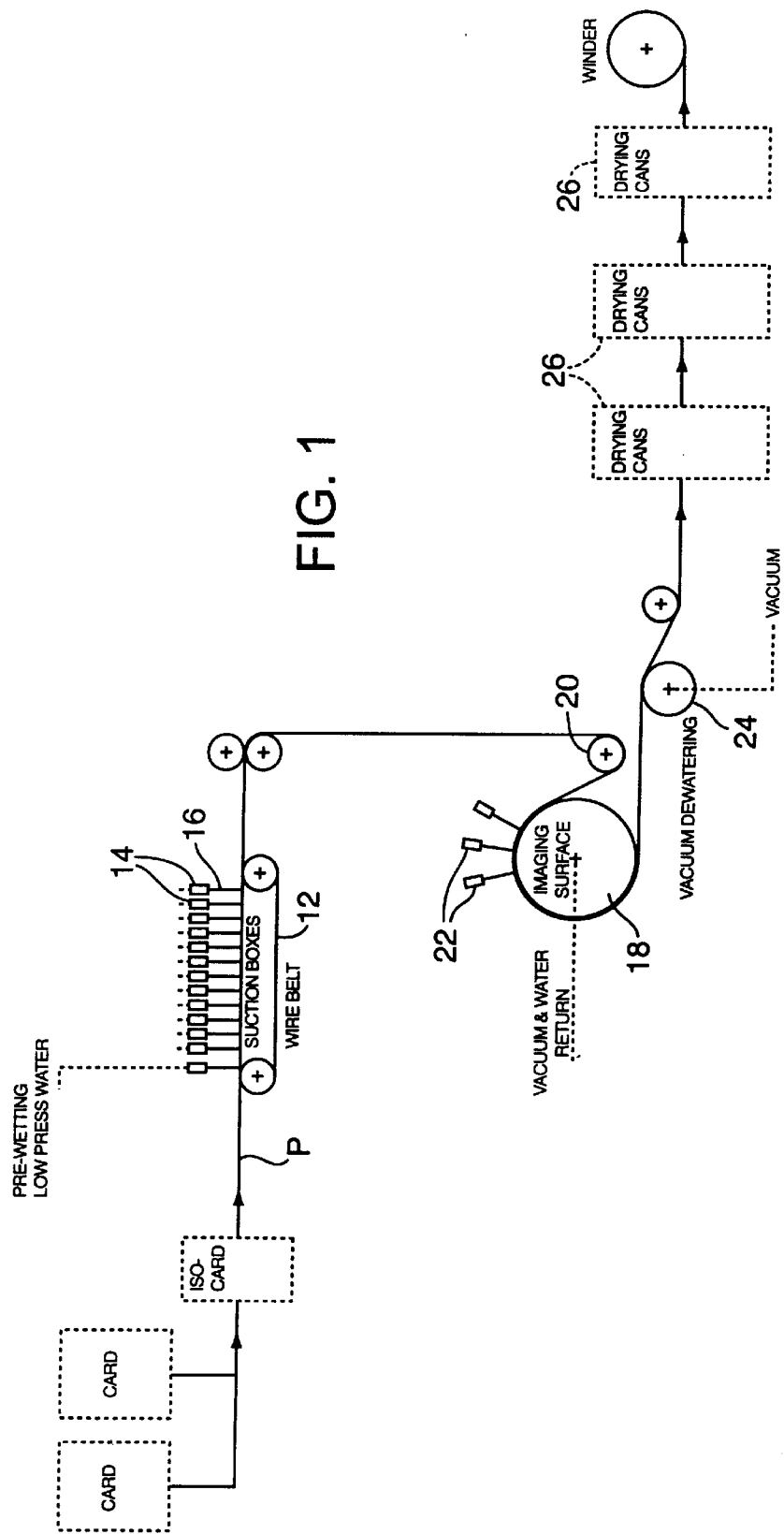

"Large Square"

Upper Plane Thickness: 0.24"
Lower Plane Thickness: 0.14"

"Small Square"

Upper Plane Thickness: 0.24"
Lower Plane Thickness: 0.14"

"Large Segmented Diamond"

Upper Plane Thickness: 0.24"
Lower Plane Thickness: 0.14"

"Small Segmented Diamond"

Upper Plane Thickness: 0.24"
Lower Plane Thickness: 0.14"

METHOD OF FABRICATING FIBROUS LAMINATE STRUCTURES WITH VARIABLE COLOR

This application claims benefit of Provisional Application No. 60/213,368 filed Jun. 23, 2000.

TECHNICAL FIELD

The present invention relates generally to a method of making a hydroentangled nonwoven fabric with variable fiber density in selected patterns where the fabric is further laminated to a colored backing material such that the intensity of the color of the backing material on the laminate surface is controlled by fiber density in the patterned regions.

BACKGROUND OF THE INVENTION

The production of conventional textile fabrics is known to be a complex, multi-step process. The production of fabrics from staple fibers begins with the carding process where the fibers are opened and aligned into a feed stock known as sliver. Several strands of sliver are then drawn multiple times on drawing frames to further align the fibers, blend, improve uniformity as well as reduce the diameter of the sliver. The drawn sliver is then fed into a roving frame to produce roving by further reducing its diameter as well as imparting a slight false twist. The roving is then fed into the spinning frame where it is spun into yarn. The yarns are next placed onto a winder where they are transferred into larger packages. The yarn is then ready to be used to create a fabric.

For a woven fabric, the yarns are designated for specific use as warp or fill yarns. The fill yarn packages (which run in the cross direction and are known as picks) are taken straight to the loom for weaving. The warp yarns (which run on in the machine direction and are known as ends) must be further processed. The packages of warp yarns are used to build a warp beam. Here the packages are placed onto a warper which feeds multiple yarn ends onto the beam in a parallel array. The warp beam yarns are then run through a slasher where a water soluble sizing is applied to the yarns to stiffen them and improve abrasion resistance during the remainder of the weaving or knitting process. The yarns are wound onto a loom beam as they exit the slasher, which is then mounted onto the back of the loom. Here the warp and fill yarns are interwoven or knitted in a complex process to produce yardages of cloth.

Coloring and shading are likewise complex processes in conventional textile production. Colors and patterns of color can be achieved by using yarns of various colors, resulting from the dyeing of the yarn packages themselves. Further, greige goods, yardage produced from undyed yarns, can be dyed in any of several ways common to the industry, such as jet dyeing, and vat dyeing. For application of color and patterns of colors onto the surface of a fabric, screen printing is commonly used, whereby pigments are applied to the fabrics by a series of engraved rolls where each roll applies a specific color and part of the pattern.

Detailed shading of colors, where more than one hue of a particular major color are apparent in the same fabric, is usually achieved with a yarn that has a blend of fibers, where each of the fibers takes up the color differently in the dyeing process. An example of such a yarn is heather yarns, popular for knitting sweaters.

In contrast, the production of nonwoven fabrics from staple fibers is known to be more efficient than traditional textile processes as the fabrics are produced directly from the carding process. Nonwoven fabrics are suitable for use in a wide variety of applications where the efficiency with which the fabrics can be manufactured provides a significant economic advantage for these fabrics versus traditional textiles. Hydroentangled fabrics have been developed with improved properties which are a result of the entanglement of the fibers or filaments in the fabric providing improved fabric integrity. U.S. Pat. No. 3,485,706, to Evans, hereby incorporated by reference, discloses processes for effecting hydroentanglement of nonwoven fabrics. More recently, hydroentanglement techniques have been developed which impart images or patterns to the entangled fabric by effecting hydroentanglement on three-dimensional image transfer devices. Such three-dimensional image transfer devices are disclosed in U.S. Pat. No. 5,098,764, hereby incorporated by reference, with the use of such image transfer devices being desirable for providing a fabric with enhanced physical properties as well as an aesthetically pleasing appearance.

It is a further aspect of this patterning technology that the density of the fiber population can be varied within specific areas of the pattern, such that a fiber rich region may appear as a raised portion and is adjacent to a comparatively fiber poor, densified region. It is this control over fiber placement that gives rise to the fabrics of this invention.

SUMMARY OF THE INVENTION

In the present invention, a hydroentangled and patterned fibrous material is laminated to a backing material which has a color that is in contrast to and usually of a deeper hue than any color in the patterned fabric. The backing material may be one of several types of materials able to provide a suitable color, such as films, foams and fibrous fabrics. The backing material may be attached by any means known in the industry for laminating to create a composite fabric, such as adhesive bonding, thermal bonding, and ultrasonic bonding or extrusion coating. It is a preferred embodiment of the present invention to use water jets for consolidating the composite when the backing material is a fibrous nonwoven. It is a further preferred embodiment of the present invention to use extrusion coating to consolidate the composite when the backing material is a primarily non-fibrous material, such as a film or foam. It is a less preferred embodiment of this invention to use adhesive bonding when the backing material is a film or foam.

It is an aspect of the present invention that the most preferred methods of consolidating the composite structure result in an intermingling of the two layers at the interface. In fact, there is a relocation of the fibers of a fibrous backing material into the facing layer fiber matrix as a result of the water jets used to consolidate the two layers. In the case of the non-fibrous, polymeric backing layers, the extrusion coating process results in the intrusion of a portion of the extruded backing material into the interstices of the fiber matrix of the facing layer.

Due to the variable thickness and density of the fibers in the patterned areas of the imaged fabric, the perception of the color of the backing material is distinct in different areas of the pattern as viewed from the patterned side of the facing fabric. In this manner, a highly decorative fabric is produced, whereby the patterned image is aesthetically enhanced by the variable hues of color associated with particular areas of the pattern.

A method of making a variably colored, nonwoven based composite material embodying the principles of the present invention contemplates the use of staple length fibers to facilitate economical fabric formation. Formation of the fibrous nonwoven fabric on a three-dimensional, image transfer device by hydroentangling imparts desired physical properties to the fabric such as the controlled placement of the fiber population relative to the desired three-dimensional pattern imparted by the imaging device. This facing fabric may be white or colored. The addition of highly colored backing materials, such as nonwoven fabrics, films or foams, results in a variable appearance of the color through the hydroentangled, patterned face fabric. In this manner, the pattern is enhanced by the creation of variations in color intensity and hue in selected regions of the pattern.

A method of making a nonwoven fabric in accordance with the present invention includes providing a precursor web comprising staple length fibers, continuous filaments or blends of staple length fibers and continuous filaments. The precursor web is preferably pre-entangled on a foraminous forming surface, preferably through the use of high-pressure water jets.

The present method further entails the provision of a three-dimensional, image transfer device having an array of three-dimensional surface elements thereon. The precursor web is positioned on the image transfer device, and hydroentangled to form an imaged nonwoven fabric.

The present invention further contemplates the addition of a colored backing material to the patterned nonwoven fabric by means known in the art. Suitable backing materials include fibrous webs, films and foams. These materials are colored by any means known in the art, such as screen printing, the use of chemical dyes or the extrusion of a film or foam containing pigments.

BRIEF DESCRIPTION OF THE DRAWINGS

FIG. 1 is a diagrammatic view of an apparatus for manufacturing a nonwoven facing fabric embodying the principles of the present invention, and includes a schematic of the process steps for the manufacture of the colored composite;

DETAILED DESCRIPTION

Figure 2A:
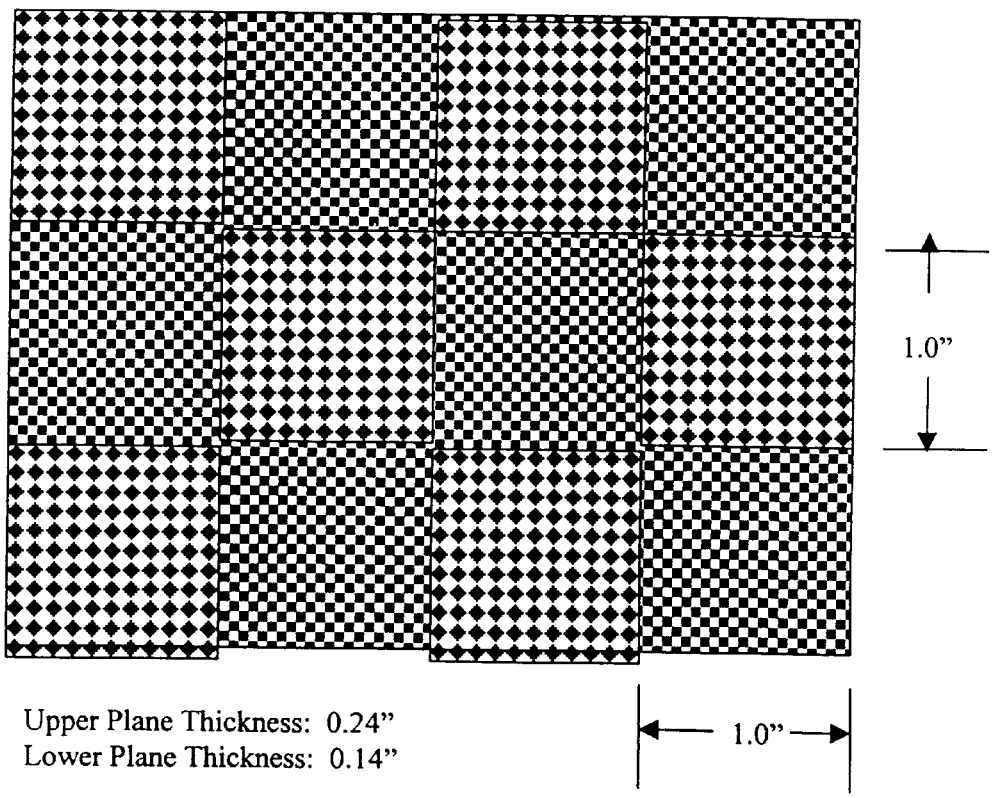
FIGS. 2a–2d are schematic representations of the preferred three dimensional imaging surfaces used to produce the patterned facing fabrics of the invention.
Figure 2B:
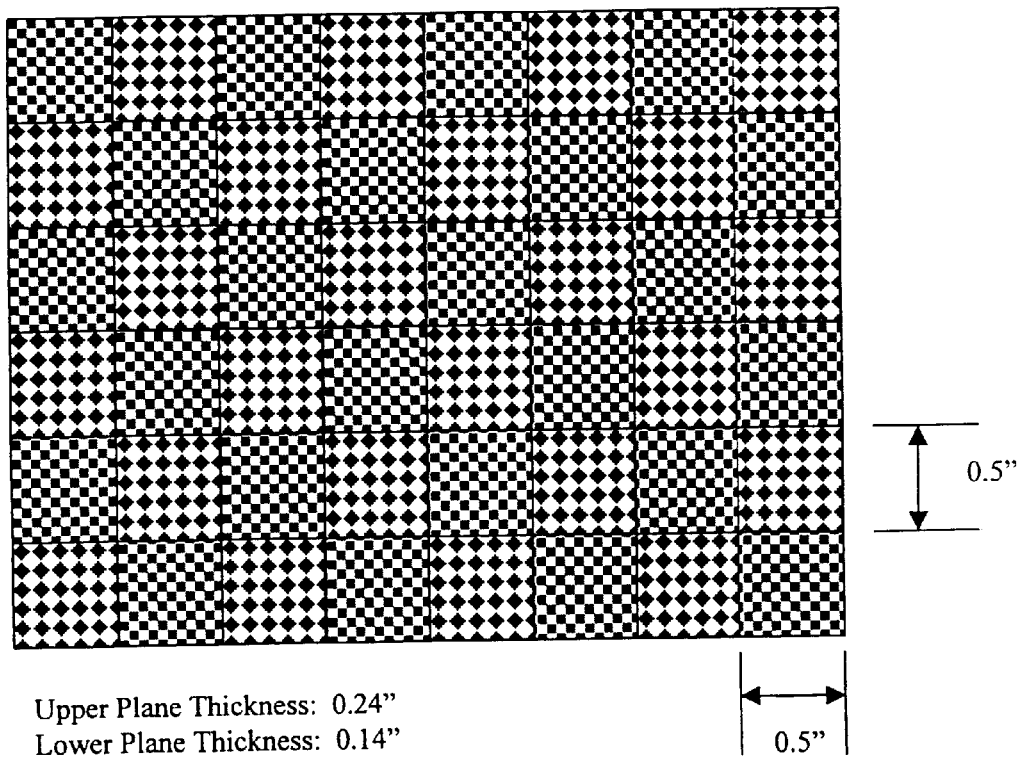
Figure 2C:
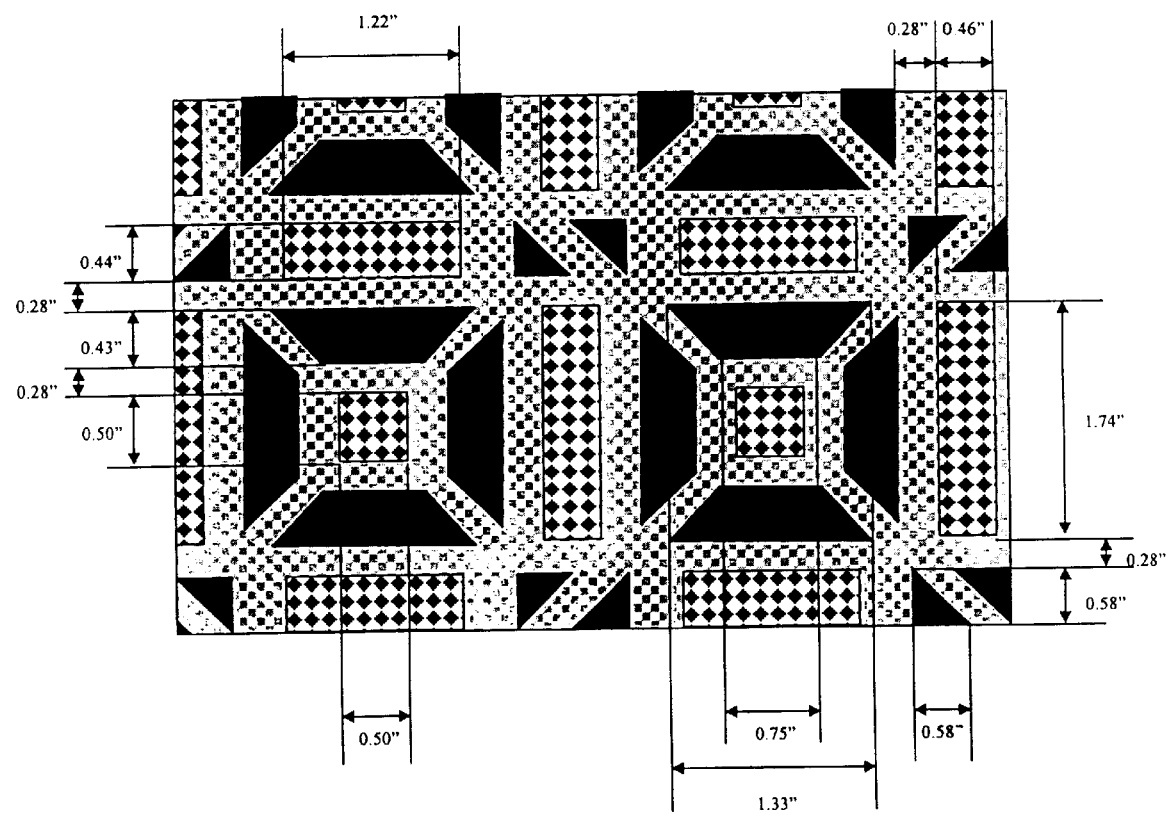
Figure 2D:
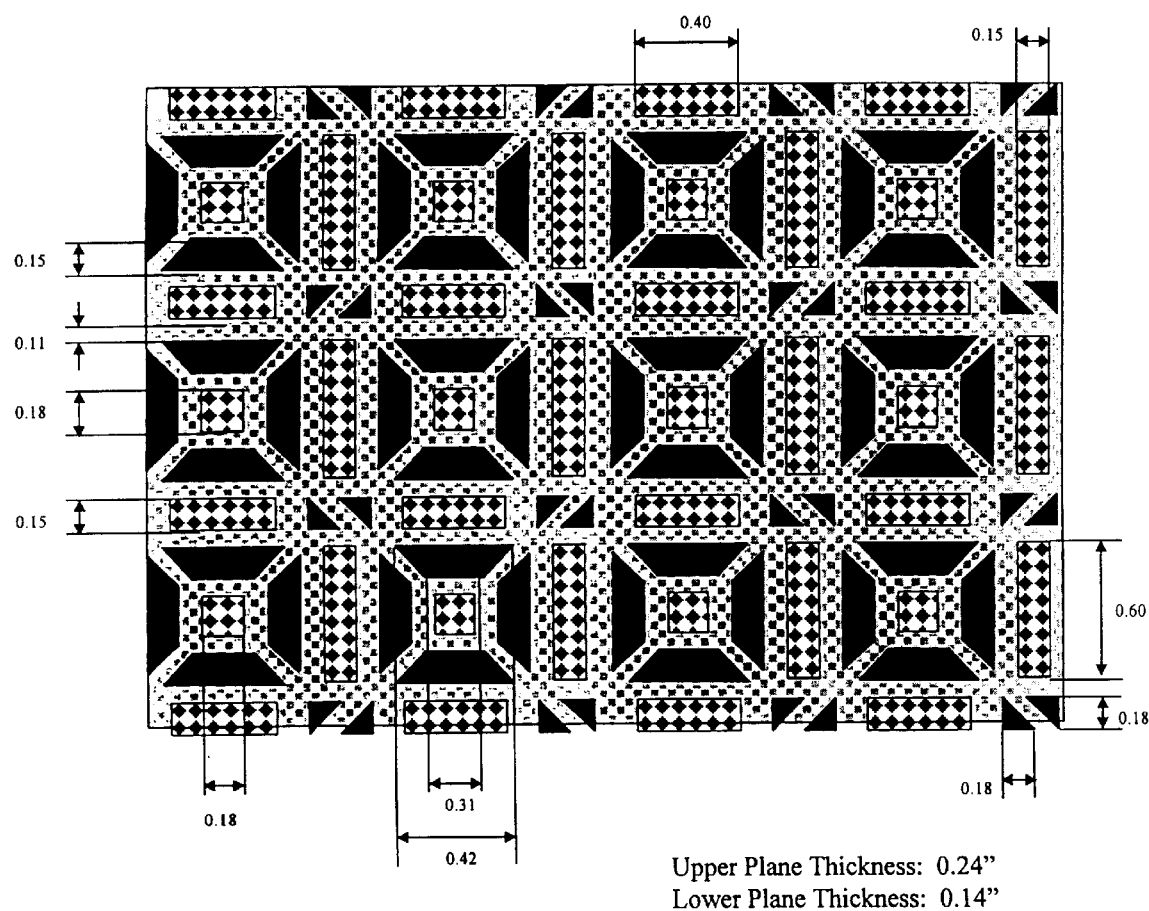
Figure 3A:
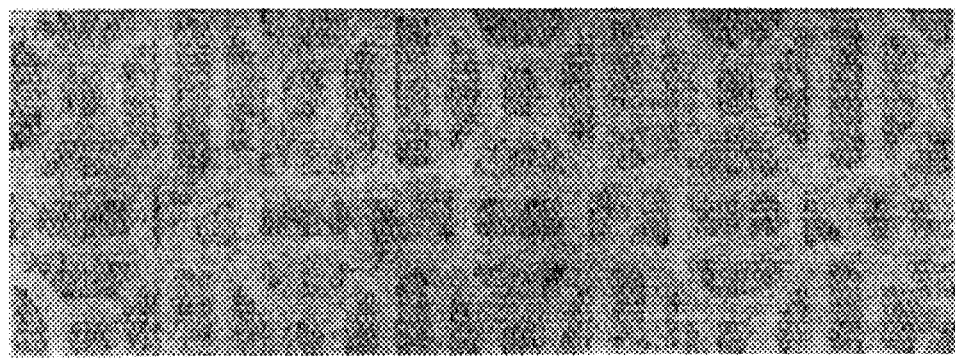
FIGS. 3a–3b are exemplary of a colored composite, viewed from the imaged surface of the facing layer, depicting the fibrous component of the backing layer having been relocated into the fibrous structure of the facing layer.
Figure 3B:
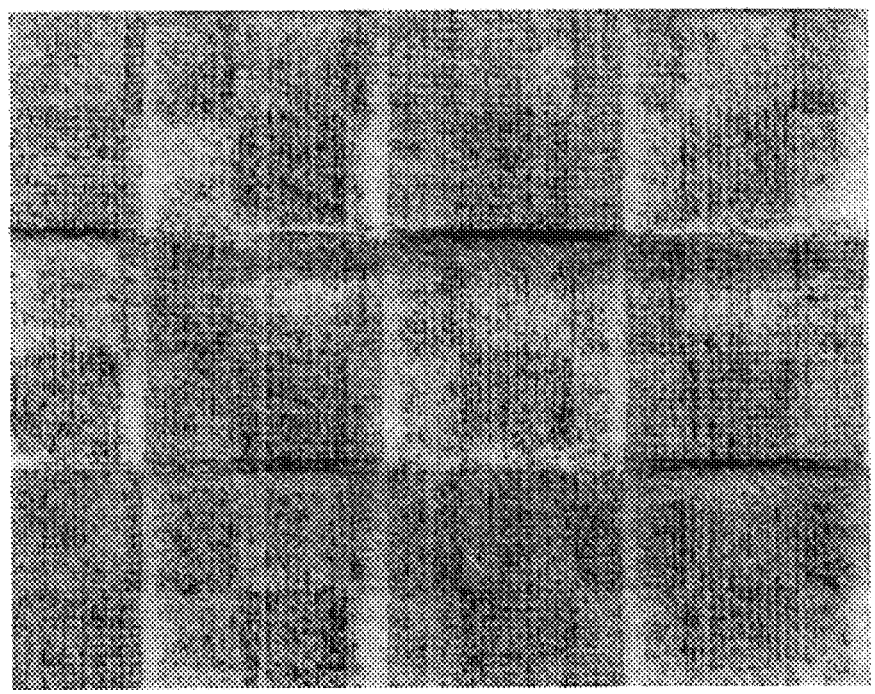
Figure 4A:
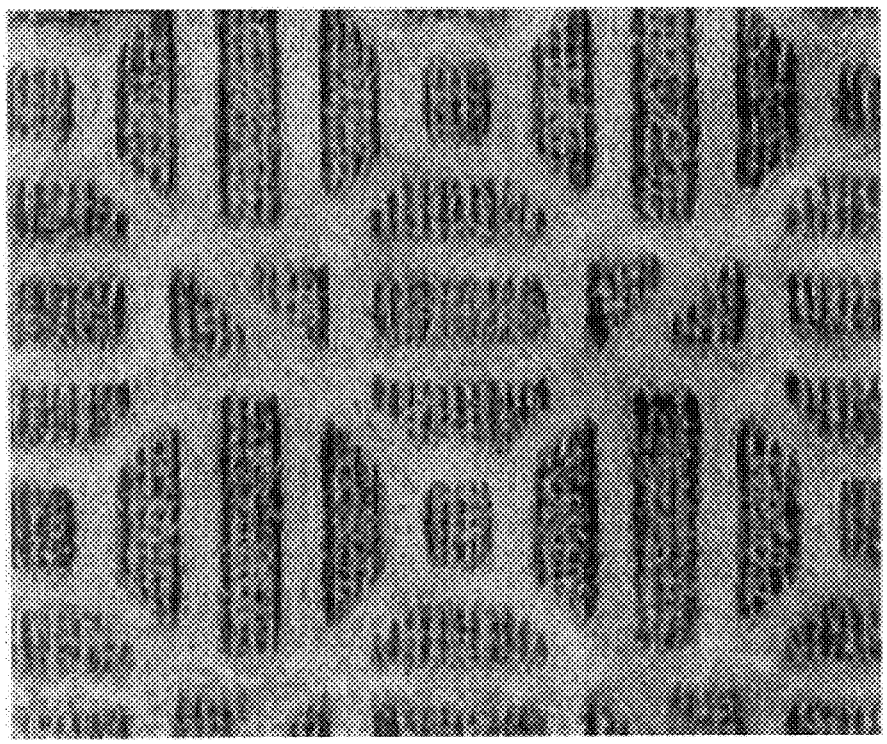
FIGS. 4a–4b are exemplary of a colored composite, viewed from the imaged surface of the facing layer, depicting a foamed backing layer having a portion of the foam component penetrating the interstitial spaces between the fibers of the imaged layer.
Figure 4B:
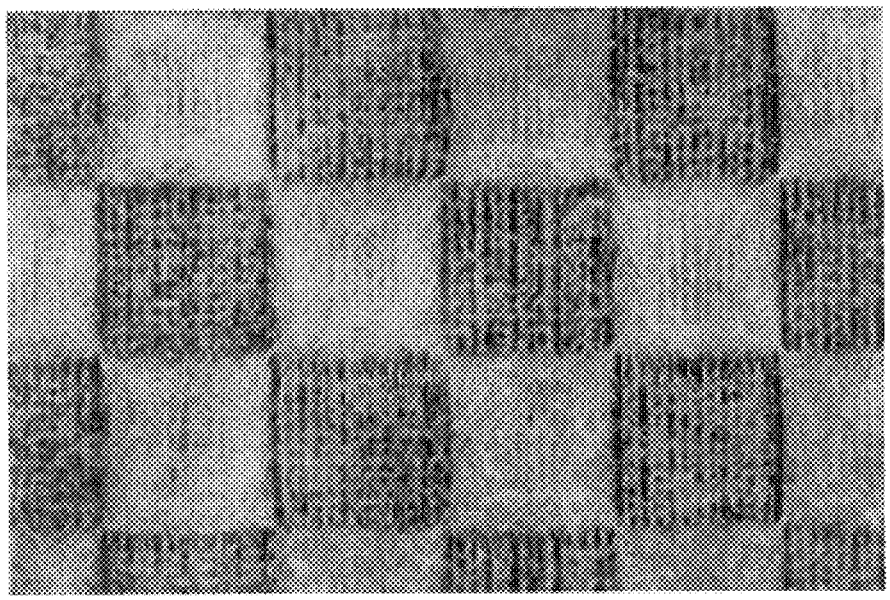

While the present invention is susceptible of embodiment in various forms, there is shown in the drawings, and will hereinafter be described, a presently preferred embodiment of the invention, with the understanding that the present disclosure is to be considered as an exemplification of the invention, and is not intended to limit the invention to the specific embodiment illustrated.

The present invention is directed to a method of forming colored composite materials based on nonwoven fabrics, such nonwoven fabrics being produced by hydroentanglement, wherein imaging and patterning of the fabrics is enhanced by hydroentanglement on a three-dimensional image transfer device. Such imaged hydroentangled fabrics are then laminated with colored backing materials, such as other nonwoven fabrics, films or foams, to produce a composite fabric. The imaging process creates a controlled variable fiber density within regions of the pattern such that the uniform color of the backing material is observed as a variety of hues of coloration within the pattern of the facing layer.

With reference to FIG. 1, therein is illustrated an apparatus for practicing the present method for forming a nonwoven fabric. The fabric is formed from a fibrous matrix preferably comprising staple length fibers, but it is within the purview of the present invention that different types of fibers, or fiber blends, can be employed. The fibrous matrix is preferably carded and cross-lapped to form a precursor web, designated P. In a current embodiment, the precursor web comprises 100% staple length polyester fibers, 100% rayon staple length fibers, and blends of those fibers.

FIG. 1 illustrates a hydroentangling apparatus for forming nonwoven fabrics in accordance with the present invention. The apparatus includes a foraminous forming surface in the form of belt 12 upon which the precursor web P is positioned for pre-entangling by entangling manifold 14.

The entangling apparatus of FIG. 1 further includes an imaging and patterning drum 18 comprising a three-dimensional image transfer device for effecting imaging and patterning of the now-entangled precursor web. The image transfer device includes a moveable imaging surface which moves relative to a plurality of entangling manifolds 22 which act in cooperation with three-dimensional elements defined by the imaging surface of the image transfer device to effect imaging and patterning of the fabric being formed.

Figure 5A:
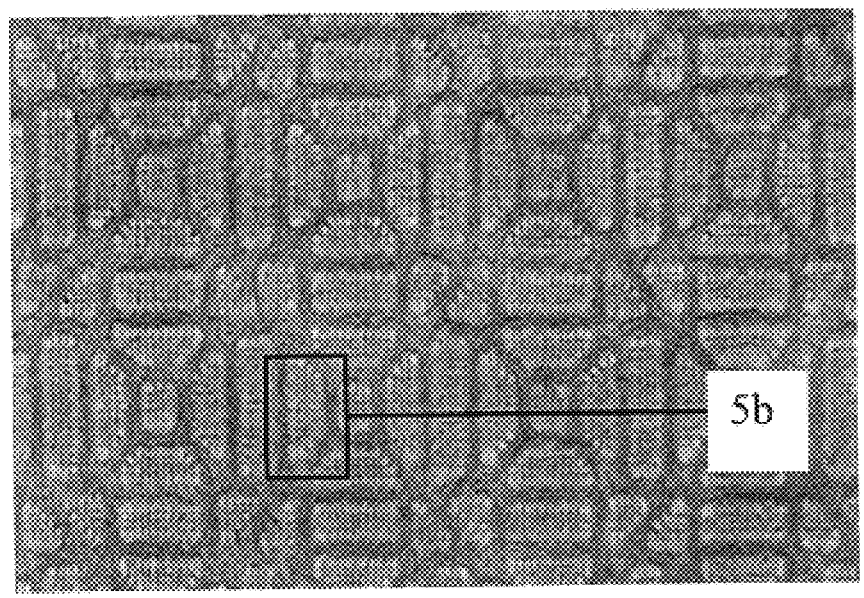
FIG. 5a is a photograph of the imaged surface of a facing layer.
Figure 5B:
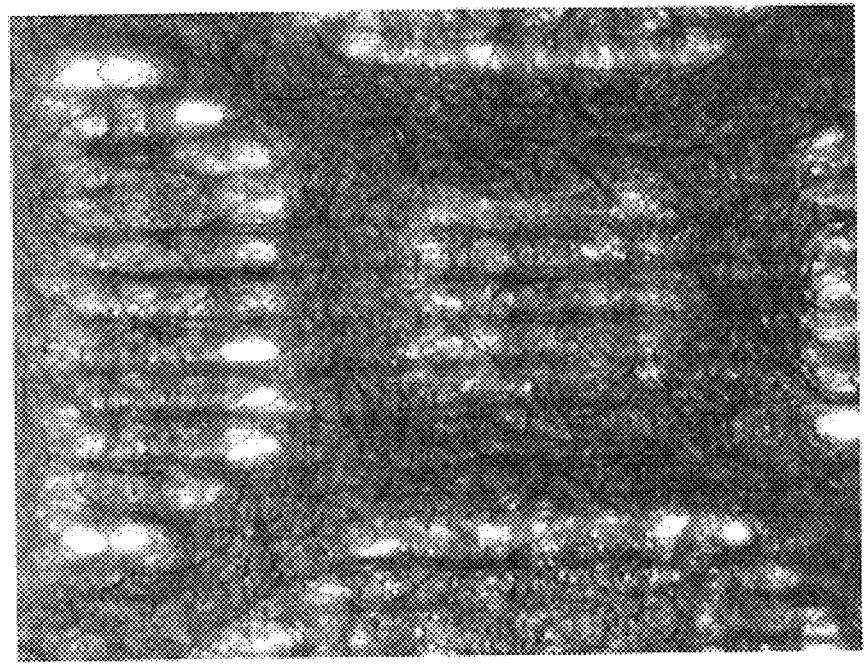
FIG. 5b is a photomicrograph of a portion of the imaged surface of a facing layer demonstrating fiber rich adjacent to fiber poor regions.

Hydroentanglement results in portions of the precursor web being displaced from on top of the three-dimensional surface elements of the imaging surface to form an imaged and patterned nonwoven fabric. A result of this imaging and patterning is the creation of adjacent regions, which are fiber rich and fiber poor. An example of this is shown in FIG. 5. Following the imaging station in FIG. 1, the facing layer is joined with a backing layer of the invention in one of several ways. A second fibrous layer may be added to the back side of the facing layer and an additional hydroentangling station is used to consolidate the composite. In this embodiment, some of the fibers of the backing layer are relocated into the facing layer and the color of the backing layer is made visible. In an alternate process of the invention, the backing layer is a non-fibrous polymeric material which may be joined to the facing layer by some adhesive means. Most preferably, the alternate process has the polymeric material of the backing layer extruded or coated directly onto the facing layer, where the consolidation results in a portion of the backing layer entering into the interstices of the fibrous matrix of the facing layer.

What is claimed is:

1. A method of making a colored non-woven composite material, comprising the steps of:

providing a first non-woven layer having a heterogeneous fiber density described in a predetermined pattern or image and a first color, providing a second non-woven layer having a different aesthetic quality than the first non-woven layer and having a heterogeneous fiber density described in a predetermined pattern or image, positioning said first and second non-woven layers in surface to surface juxtaposition, applying high pressure fluid streams upon the second non-woven layer to induce relocation of the fibrous component of the second non-woven layer into the fibrous structure of the first non-woven layer, whereby the fibrous component of the second non-woven layer is apparent on the face of the first non-woven layer in the regions of the first non-woven layer where the fiber density is lower than the surround areas of the first non-woven layer.

2. A method of making a non-woven composite material in accordance with claim 1, wherein:

the first non-woven layer is a hydroentangled fabric.

3. A method of making a non-woven composite material in accordance with claim 1, wherein:

the first non-woven layer is comprised of material selected from the group consisting of staple length natural fiber, staple length polymeric fiber, continuous polymeric filament, and mixtures thereof.

4. A method of making a non-woven composite material in accordance with claim 1, wherein:

the different aesthetic quality of the second non-woven layer is selected from variations in color, tint, hue, brightness, opacity, or combinations thereof.

5. A method of making a non-woven composite material in accordance with claim 1, wherein:

the second non-woven layer is selected from the group consisting of a carded fibrous batt, an air-laid fiber web, a spun-laid filament web, a melt-blown filament web, a consolidated non-woven fabric, and combinations thereof.

6. A method of making a non-woven composite material in accordance with claim 5, wherein:

the second non-woven layer is comprised of material selected from the group consisting of staple length natural fiber, staple length polymeric fiber, continuous polymeric filament, and mixtures thereof.

7. A method of making a non-woven composite material in accordance with claim 1, wherein:

first non-woven layer is in the basis weight range of about 1.0 to 6.0 ounces per square yard.

8. A method of making a non-woven composite material in accordance with claim 1, wherein:

the second non-woven fabric layer is in the basis weight range of about 0.5 to 4.5 ounces per square yard.

9. A method of making a non-woven composite material in accordance with claim 1, wherein:

the high pressure fluid streams may be at equivalent or differing pressures.

* * * * *